US010172372B2

(12) United States Patent
Cocchi et al.

(10) Patent No.: US 10,172,372 B2
(45) Date of Patent: Jan. 8, 2019

(54) MACHINE AND METHOD FOR MAKING LIQUID AND SEMI-LIQUID PRODUCTS OF THE ICE CREAM SECTOR

(71) Applicant: ALI S.p.A.—CARPIGIANI GROUP, Milan (IT)

(72) Inventors: Andrea Cocchi, Calderara di Reno (IT); Roberto Lazzarini, Reggio Emilia (IT)

(73) Assignee: ALI S.P.A.—CARPIGIANI GROUP, Milan (IT)

( * ) Notice: Subject to any disclaimer, the term of this patent is extended or adjusted under 35 U.S.C. 154(b) by 137 days.

(21) Appl. No.: 15/270,480

(22) Filed: Sep. 20, 2016

(65) Prior Publication Data
US 2017/0112165 A1    Apr. 27, 2017

(30) Foreign Application Priority Data
Oct. 22, 2015   (IT) .................... 102015000064514

(51) Int. Cl.
*A23G 9/08*   (2006.01)
*A23G 9/12*   (2006.01)
*A23G 9/22*   (2006.01)
*A23G 9/28*   (2006.01)

(52) U.S. Cl.
CPC .............. *A23G 9/22* (2013.01); *A23G 9/08* (2013.01); *A23G 9/12* (2013.01); *A23G 9/28* (2013.01)

(58) Field of Classification Search
CPC ... A23G 9/22; A23G 9/28; A23G 9/08; A23G 9/12
See application file for complete search history.

(56) References Cited

U.S. PATENT DOCUMENTS 6,182,862 B1 *   2/2001   McGill ................. A23G 9/28
                                                          222/1

FOREIGN PATENT DOCUMENTS

| EP | 2401945 A1 | 1/2012 |
|---|---|---|
| WO | WO2015022678 A1 | 2/2015 |
| WO | WO2015056188 A1 | 4/2015 |
| WO | WO2015092637 A1 | 6/2015 |
| WO | WO2015104610 A1 | 7/2015 |

OTHER PUBLICATIONS

Italian Search Report dated Apr. 20, 2016 for counterpart Italian Application No. IT UB20155038.

\* cited by examiner

*Primary Examiner* — Cassey D Bauer
(74) *Attorney, Agent, or Firm* — Shuttleworth & Ingersoll, PLC; Timothy Klima

(57) ABSTRACT

A machine for making liquid and/or semi-liquid products of the ice cream sector including a processing container forming a processing chamber for making an ice cream product; a stirrer mounted inside the processing chamber; a cooling system equipped with at least one heat exchanger associated with the processing container, for exchanging heat with the container and cooling the processing container; a unit for receiving and treating a capsule containing a basic preparation for an ice cream product, configured to allow the capsule to be compressed in such a way so as to deform lateral walls of the capsule and to squeeze the basic preparation out of the capsule and transfer it to the processing container; a device for injecting a dilution liquid, associated with the processing container, for injecting the dilution liquid into the processing container.

14 Claims, 6 Drawing Sheets

MACHINE AND METHOD FOR MAKING LIQUID AND SEMI-LIQUID PRODUCTS OF THE ICE CREAM SECTOR

This application claims priority to Italian Patent Application 102015000064514 filed Oct. 22, 2015, the entirety of which is incorporated by reference herein.

BACKGROUND OF THE INVENTION

This invention relates to a machine and a method for making liquid and semi-liquid products of the ice cream sector (gelati, sorbets, soft ice cream, etc.).

As is known, a need which is strongly felt in this sector is that of being able to make ice cream type products in small portions very quickly and to a customer's individual request.

In effect, customers often demand to be able to have ice cream made on the spot to their specifications.

Patent document WO2015/092637, in the name of RDL Srl, describes a machine for preparing ice cream in individual portions and equipped with a mixing and cooling unit and a unit for loading a capsule.

A need which is felt particularly strongly by machine manufacturers is that of having a machine capable of making liquid and semi-liquid products of the ice cream sector in very small quantities (single portions) and which is particularly simple and reliable.

Another particularly strongly felt need in the sector in question is the need for a machine which allows reducing the risks of product contamination, thus increasing food safety.

SUMMARY OF THE INVENTION

The aim of this invention is to provide a machine and a method for making products of the ice cream sector, in particular ice cream, which allow satisfying the above mentioned need and, more specifically, a machine and a method which allow making small quantities of ice cream particularly easily based on the requirements expressed on the spot by the customer.

Another aim of the invention is to provide a machine and a method for making liquid and semi-liquid products of the ice cream sector and which allow reducing the risks of product contamination.

A further aim of the invention is to provide a machine and a method for making liquid and semi-liquid products of the ice cream sector and which constitute an effective alternative to the products of known type.

According to the invention, this aim is achieved by a machine and a method for making liquid and/or semi-liquid products of the ice cream sector and comprising the technical features set out in one or more of the appended claims.

BRIEF DESCRIPTION OF THE DRAWINGS

The technical features of the invention, with reference to the above aims, are clearly described in the claims below and its advantages are apparent from the detailed description which follows, with reference to the accompanying drawings which illustrate a preferred, non-limiting example embodiment of the invention, and in which:

Figure 1:
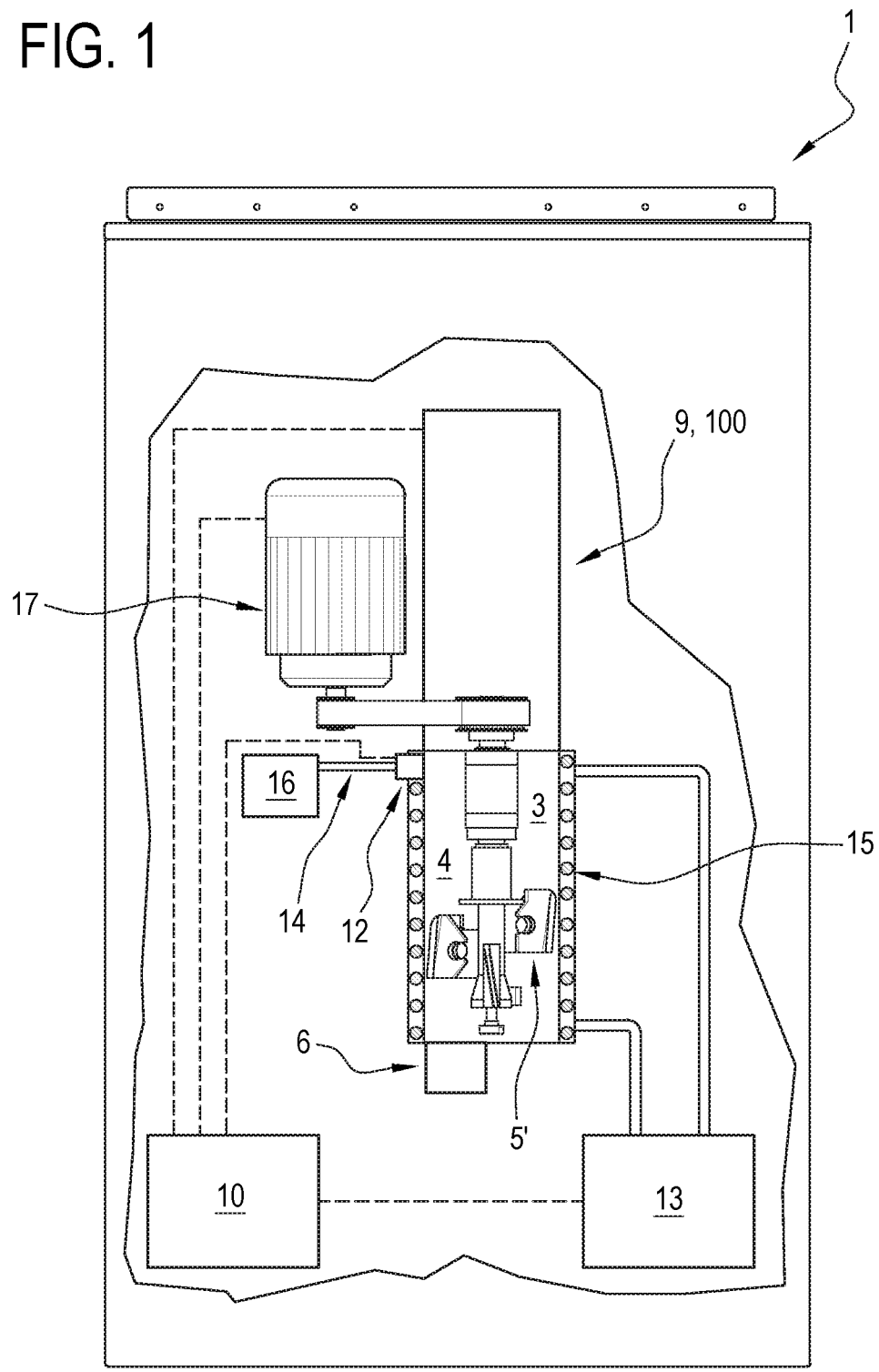
FIG. 1 is a schematic view of a machine according to this invention.
Figure 2:
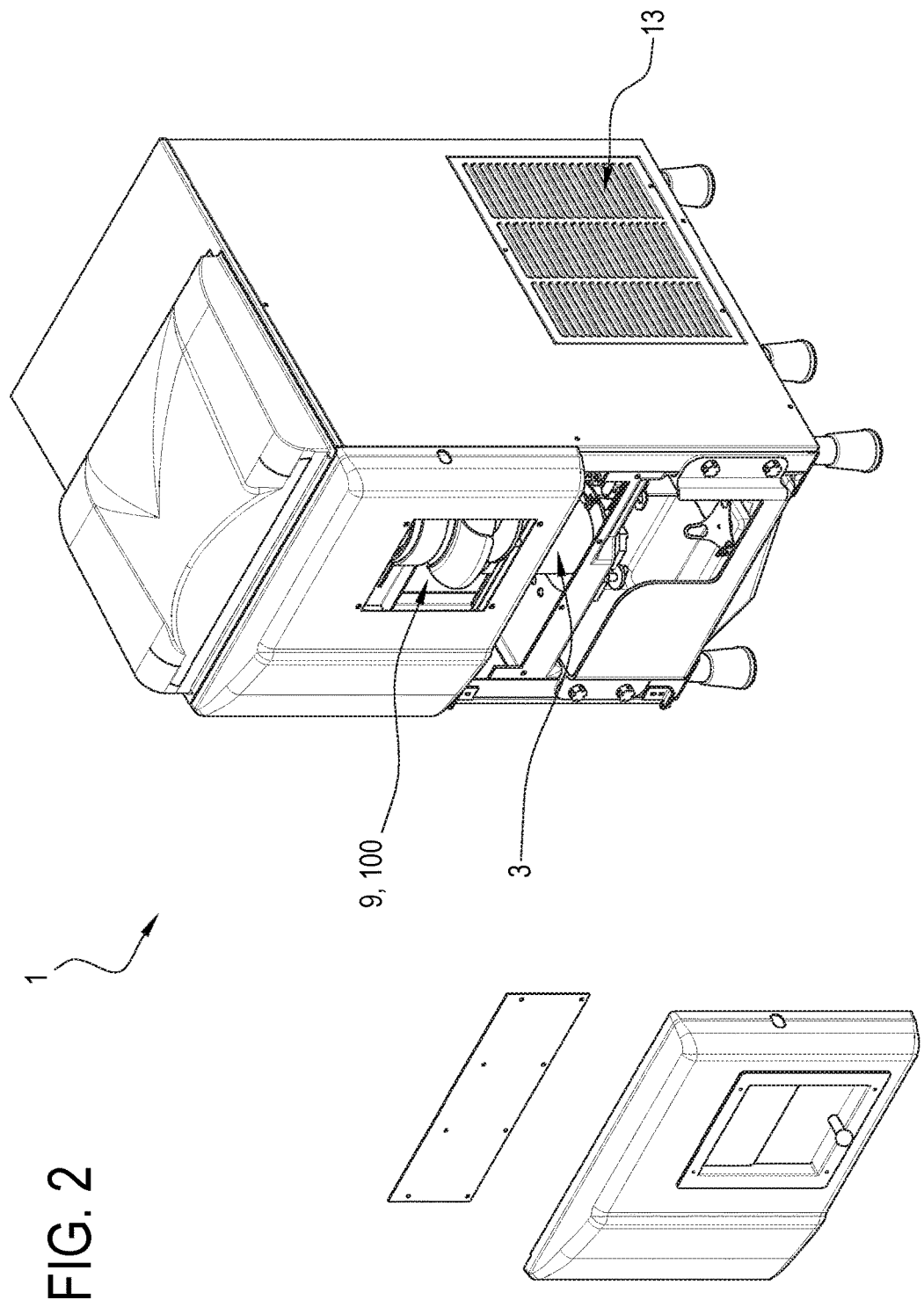
FIG. 2 is a schematic perspective view of a machine according to this invention.

With reference to the accompanying drawings, the numeral 1 denotes a machine for making liquid and/or semi-liquid products of the ice cream sector (that is, products such as artisan gelato, sorbet, soft ice cream, etc.).

DESCRIPTION OF THE PREFERRED EMBODIMENTS

It should be noted that the machine is preferably designed to make cold products of the ice cream sector.

Preferably, the machine 1 is an ice cream machine, designed to make ice cream (preferably artisan gelato).

In the context of the invention, the term "ice cream" is used to mean a food preparation which is based on milk or milk-derived products and to which fruit, aromatics or other ingredients are added to obtain different flavours.

The machine 1 comprises:
- a processing container 3 defining a processing chamber 4;
- a stirrer 5 mounted inside the processing chamber 4 (not illustrated and schematically indicated in the accompanying drawings);
- a thermal treatment system 13 (for cooling), provided with at least one heat exchanger 15 associated with the processing container 3, for exchanging heat;
- a device (or unit) 9 (hereinafter also referred to as dispensing assembly 100) for receiving and treating a capsule 201 containing a basic preparation P (for making a product of the ice cream sector, in particular, ice cream) adapted to squeeze the basic preparation P out of the capsule 201 (by compressing the capsule 201 in such a way as to deform lateral walls 204 of the capsule 201) and to release it into the processing chamber 4.
- a device 12 for injecting a dilution liquid (preferably water), associated with the processing container 3, for injecting the dilution liquid into the processing container 3.

Preferably, the machine also comprises serving means 6 (for serving the finished product), operating at the processing chamber 4 for delivering the (finished) product to the outside of the processing chamber 4.

It should be noted that the stirrer 5 is adapted to be driven in rotation to allow mixing the basic product (transferred from the capsule into the processing chamber 4) with the dilution liquid inside the processing chamber 4.

Preferably, the machine 1 comprises an actuator 17 (drive motor) to drive the stirrer 5 in rotation.

Preferably, the dimensions of the processing container 3 are such as to allow it to hold a portion of finished product (for example, ice cream) of between 50 g and 400 g, and more preferably, between 75 g and 200 g.

Preferably, the container 3 is cylindrical in shape.

Preferably, the container 3, cylindrical in shape, has a vertical axis.

Preferably, the container 3 is between 50 and 100 mm in diameter.

Still more preferably, the container 3 is between 80 and 250 mm in (axial) length.

Preferably, the container 3 is between 157,000 mm3 and 1,962,500 mm3 in volume.

It should be noted that the machine 1 is preferably adapted to process a single portion of product.

With reference to the capsule 201, it should be noted that the capsule 201 may contain one or more liquids, or one or more powders, or a granulate, or a gel, defining a basic preparation for the ice cream type product.

It should be noted that the device 9 for receiving and treating the capsule 201 is positioned preferably above the container 3, that is, above the processing chamber 4.

According to another aspect, the device 12 for injecting a dilution liquid is configured to deliver water or a water-based mixture so as to allow diluting the basic preparation in the capsule with water or a water-based mixture.

Alternatively, the device 12 for injecting a dilution liquid is configured to deliver milk or a milk-based mixture so as to allow diluting the basic preparation in the capsule with milk or a milk-based mixture.

More generally speaking, the device 12 for injecting a dilution liquid is adapted to deliver a dilution liquid or a mixture of two or more different types of liquid.

Preferably, the injection device 12 also comprises a tank 16 for containing the dilution liquid.

The injection device 12 preferably further comprises a transfer pump (not illustrated) for transferring the dilution liquid from the tank 16 containing it to the point of delivery/dilution (where the dilution liquid is delivered and mixed with the basic preparation).

It should be noted that the device 12 for injecting a dilution liquid is advantageously associated with the processing chamber 4, that is, with the container 3.

More precisely, the device 12 for injecting a dilution liquid releases the dilution liquid into the container 3.

Further, according to another aspect, the device 12 for injecting a dilution liquid may comprise a duct connected to a water supply (not illustrated).

According to this aspect, the injection device 12 preferably comprises one or more valves which can be turned on or off to make or break the connection with the water supply.

According to this aspect, the dilution liquid is delivered (directly) into the processing chamber 4: thus, the injection device 12 is configured to deliver the dilution liquid into the processing chamber 4.

Preferably, the heat exchanger 15 is wound in a coil on the walls of the cylindrical container 3.

Preferably, the processing container 3 is provided with a door (at the bottom) for cleaning, and/or extracting the product from, the processing chamber 4.

The mixing and simultaneous thermal cooling treatment step is carried out inside the processing container 3 so as to convert the basic preparation, diluted with the dilution liquid, into the finished product (for example, an ice cream type product).

It should be noted that this step is extremely rapid (in the order of minutes, preferably less than 180 s).

It should be noted that during the stirring and simultaneous thermal treatment step, the basic preparation P (diluted with the dilution liquid) is thermally treated at a temperature between −15° C. and −2° C.

Thus, the cooling means 13 are configured to cool the basic preparation P (diluted with the dilution liquid) inside the container 3 down to a temperature between −15° C. and −2° C. and, more preferably, between −13° C. and −3° C.

The control and drive unit 10 is thus configured to regulate the cooling system 13 in such a way as to enable the mixture being processed inside the container 3 to be cooled to a temperature in a range between −15° C. and −2° C. and, more preferably, between −13° C. and −3° C.

It should be noted that the cooling means 13 preferably comprise a compressor and a hydraulic circuit (which the compressor is connected to) containing a heat exchanger fluid.

The heat exchanger 15 associated with the container 3 is configured to allow heat exchange between the heat exchanger fluid and the basic preparation P (diluted with the dilution liquid) inside the container 3.

It should be noted that the heat exchanger 15 associated with the container 3, in cooling during normal use, acts as an evaporator.

Preferably, the cooling means (system) 13 comprise a further exchanger (condenser), not illustrated.

Preferably, the cooling means 13 are configured to operate according to a thermodynamic cycle, preferably a vapour compression cycle.

With reference to the capsule 201, it should be noted that the capsule 201 has a top wall 208, or covering element, a bottom wall 203, or base wall, and a side wall 204 connecting the top wall to the bottom wall.

The capsule 201 is described in more detail below.

These walls enclose an internal space or cavity 205 containing one or more basic products defining the basic preparation P.

As illustrated in FIG. 1, the machine 1 comprises a storage tank 16 for the basic liquid, and a connecting duct 14 connecting the storage tank 16 to the injection device 12.

With reference to the serving means 6 (for serving the finished product), it should be noted that these may be operated manually or automatically.

It should be noted that the machine 1, using capsules 201, advantageously allows making very small quantities of ice cream in very short spaces of time (to the customer's specifications and taste).

Furthermore, with reference to the advantages of the invention, it should be stressed that the machine 1 avoids the need to handle the food product, thus substantially minimizing the risk of contamination.

Thus, a food product of particularly high quality can be guaranteed.

Further, the machine according to this invention can be cleaned in a particularly quick and easy manner (using a cleaning-in-place procedure).

Moreover, the machine 1 of the invention has a particularly reduced footprint, which means that shop floor space can be optimized.

The advantages of the machine 1 of the invention also include a reduced impact on the environment and reduced maintenance requirements.

Described in more detail below is the dispensing assembly 100: some advantages of the invention can be inferred from this description.

Figure 3:
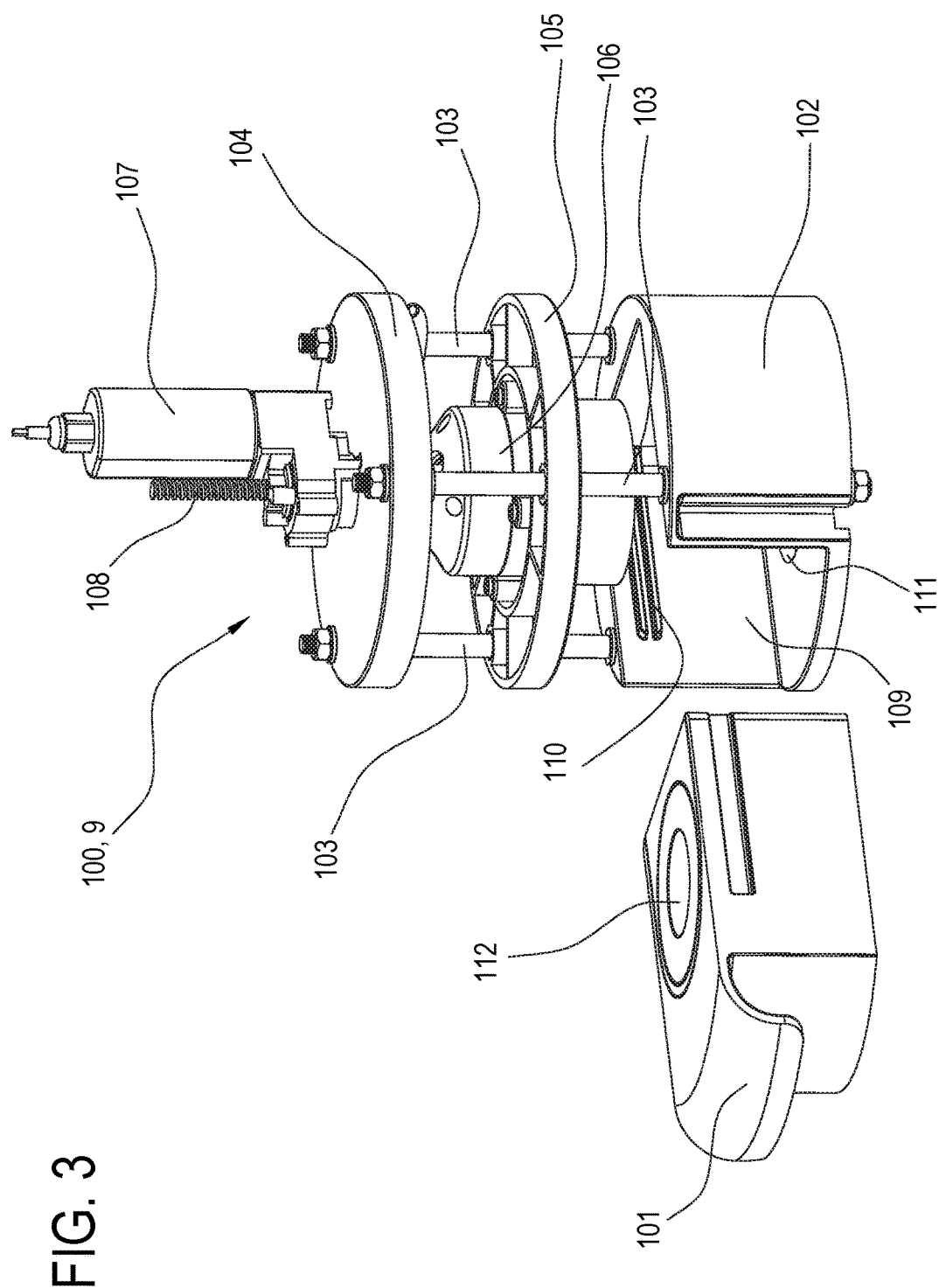
FIGS. 3 to 6 illustrate details showing a device for loading and treating a capsule and forming part of the machine of this invention.
Figure 4:
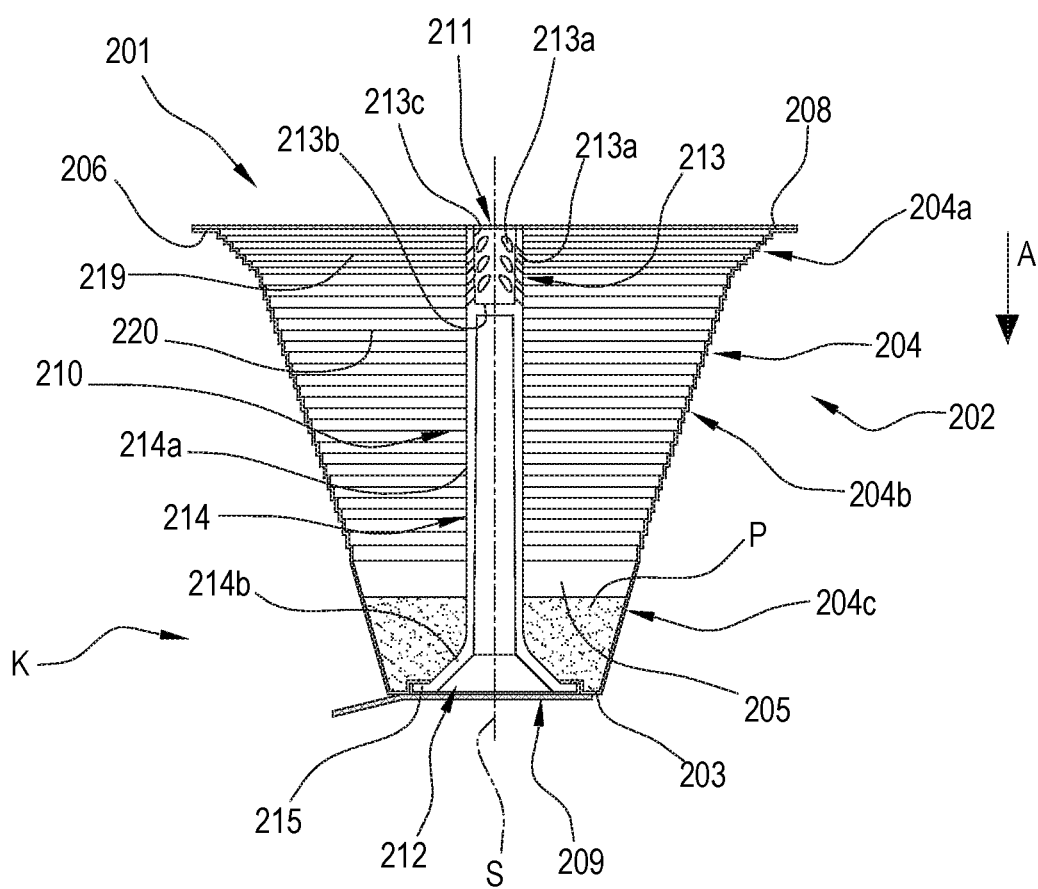

FIG. 3 illustrates a dispensing assembly 100 by which a food preparation P, contained in a capsule 201, is dispensed and used to make an ice cream, (FIG. 4).

The dispensing assembly 100 is, for example, of the type described in patent application MO2013A000295 in the name of Sarong Societá per Azioni.

The dispensing assembly 100 comprises a base 102 which supports a plurality of columns 103 fixed at the bottom to the base 102 and at the top to a fixing element 104, for example in the shape of a disc.

The dispensing assembly 100 also comprises a dispensing unit 106 which is configured to inject a pressurized fluid F (for example air) into the capsule 201 by means of injection means (not illustrated) and to compress it in such a way as to squeeze the food product P out of the capsule 201.

The injection means preferably comprise a source of pressurized fluid.

The dispensing unit 106 is mounted above a compartment 109 designed to house a drawer element 101 (which, more generally speaking, defines a capsule loading element 101) equipped with a housing 112 designed to hold a compressible, squeezable capsule 201 containing the product P to be dispensed, for example a product in powder, liquid or paste form.

The drawer element 101 may be inserted into the compartment 109, or extracted therefrom, by making it slide on guides 110 provided in the compartment 109.

On the bottom of the compartment 109, there is an opening 111 through which the product P is sent to the mixing and cooling device of the ice cream making machine (that is, to the container 3).

The dispensing unit 106 is fixed to a supporting element 105 slidably coupled to the columns 103.

The dispensing unit 106 is connected to a threaded shaft 108 which is driven by an actuator 107 to rotate and slide in a direction parallel to the columns 103, that is, in a vertical direction, in such a way as to move the dispensing unit 106 up or down along the columns 103 together with the supporting element 105.

In other words, the dispensing unit 106 is driven by a lead nut and screw mechanism or device.

When it is moved down, the dispensing unit 106 compresses the capsule 201 inside the housing 112 of the drawer element 101, causing the food preparation P to be squeezed out of the capsule 201 and delivered through the hole 111 to the mixing and cooling device.

For the constructional details of the dispensing unit 106, the reader is referred to the aforementioned patent application MO2013A000295.

The capsule 201 comprises a case 202 which includes a base wall 203 and a side wall 204 defining a cavity 205 for containing the food preparation P and an edge 206 in the form of a flange extending from the side wall 204.

The side wall 204 is deformable along predefined lines of compliance 219, 220 to allow the case 202 to be compressed along a direction A transverse to the base wall 203.

The side wall 204 of the capsule comprises a first zone 204a contiguous to the flanged edge 206 and provided with a first group of first lines of compliance 219, a second zone 204b contiguous with the first zone 204a and provided with a second group of second lines of compliance 220 and a third zone 204c extending from the second zone 204b to the base wall 203 and optionally provided with a third group of third lines of compliance (not illustrated).

The first lines of compliance 219, the second lines of compliance 220 and, optionally, the third lines of compliance are parallel to each other and parallel to the base wall 203 of the capsule 201 to allow the case 202 to be compressed along the direction transverse to the base wall 203.

The base wall 203 comprises an outlet opening 207 to let the food preparation P out of the capsule 201.

The capsule 201 also comprises a covering element 208 fixed to the flanged edge 206 in order to hermetically seal the cavity 205 and a closing element 209 fixed in a partly detachable manner at least to the base wall 203 in order to hermetically seal the outlet opening 207.

A nozzle 210, through which a pressurized fluid F (for example air) can be injected into the cavity 205, is fixed to the cover element 208.

The nozzle 210 comprises a first, hollow portion 213, which is positioned to receive the means for injecting the fluid F, and comprises a plurality of openings 213a for feeding the fluid F from the injection means to the cavity 205.

The injection means are inserted into the first portion 213 through a first end 211 of the nozzle 210.

The nozzle 210 also comprises a second portion 214 which includes a second end 212, extends through the outlet opening 207 and comprises a first, tubular stretch 214a with constant cross section, and a second stretch 214b which is shaped relative to the first stretch 214a and terminates with an outer flange 215 which peripherally surrounds the second end 212 and closes the outlet opening 207 when the capsule 201 is in a first, non-deformed configuration K (FIG. 4).

Figure 5:
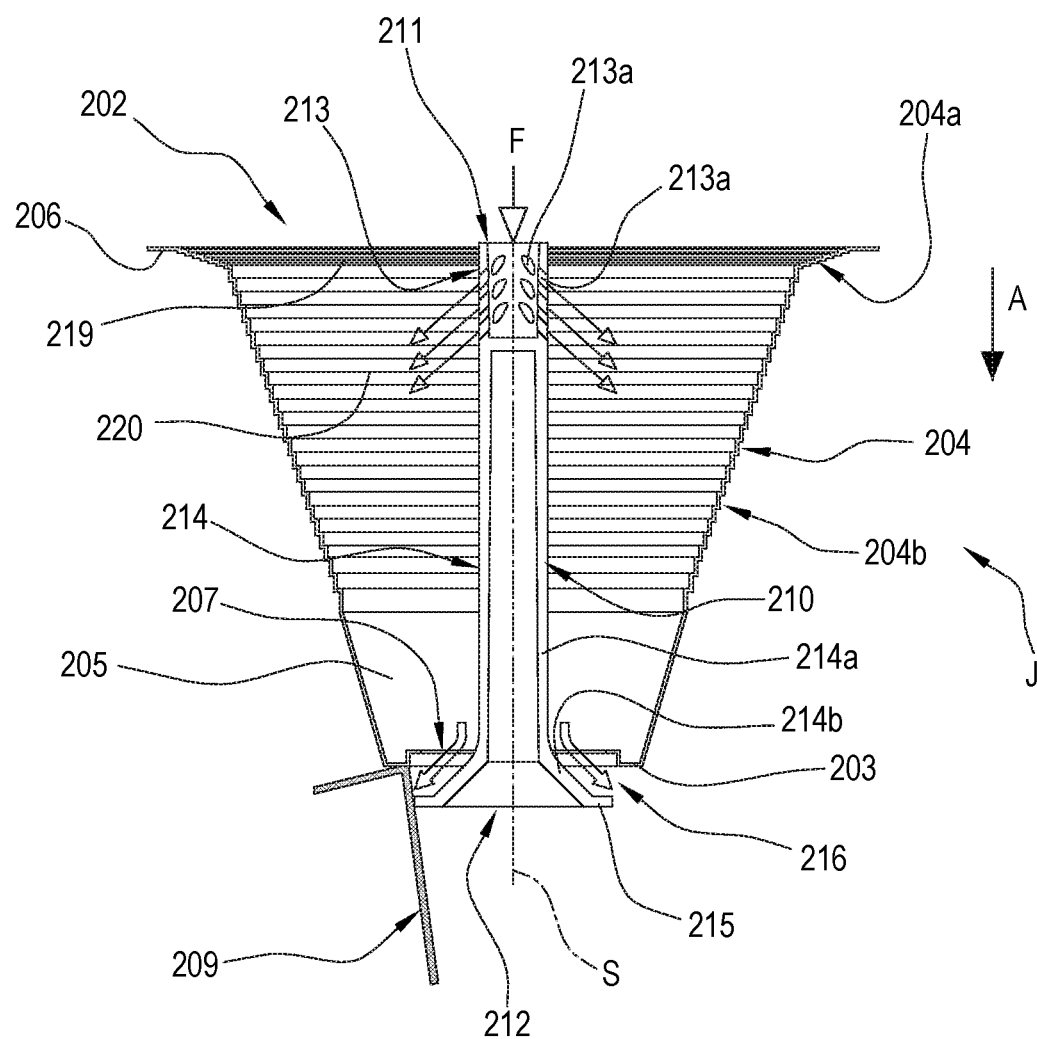

The outer flange 215 of the nozzle 210 is configured to push the closing element 209 outwards to open the capsule 201 when the capsule 201 is compressed to pass from the first configuration K to a second, deformed configuration J (FIG. 5).

The second stretch 214b of the nozzle 210 is made to protrude from the base wall 203 of the capsule 201 when the capsule 201 is further compressed and passes from the second configuration J to a third, further deformed configuration E (FIG. 6) Further, the second stretch 214b of the nozzle 210 is divergent in shape in such a way as to guide the food preparation P outwards as it is squeezed out of the outlet opening 207 by the pressurized fluid when the capsule 201 is in the configuration J or in the third configuration E.

To dispense the food product P from the capsule 201 and transfer it to the mixing and cooling device, the capsule 201 is inserted into the housing 112 of the drawer 101 of the dispensing assembly 100 and the drawer 101 is in turn inserted into the compartment 109 located under the dispensing unit 106

After inserting the drawer 101 with the capsule 201 in it into the compartment 109, the actuator 107 is activated to move the dispensing unit 106 down until the injection means pierce the covering element 208 and are received in the first portion 213 of the nozzle 210. As it continues moving down, the dispensing unit 106 starts squeezing the case 202 of the capsule 201.

In a first step of squeezing the case 202, the nozzle 210 slides into the outlet opening 207 and the outer flange 215 pushes the closing element 209 outwards in such a way as to detach the closing element 209 itself at least partly.

At the same time, the side wall 204 is compressed at the first zone 204a thanks to the first lines of compliance 219, which are moved close together. That way, the volume of the case 202 is reduced, as shown in FIG. 5, because the capsule 201 passes from the first, non-deformed configuration K to the second, compressed configuration J.

The nozzle 210 protrudes from the base wall 203 by a limited amount and an annular opening 216 is formed between the base wall 203 and the second portion 214 of the nozzle 210 to let the food preparation P start coming out of the capsule 201.

In the first squeezing step, the annular opening 216 is reduced in size but detaching the closing element 209, even if partly, places the cavity 205 in communication with the outside atmosphere through the annular opening 216.

During the first squeezing step, the injection means start injecting the pressurized fluid F into the cavity 205 in order to assist the exit of the product P from the capsule 201.

If the product P is a powder product, the fluid F is compressed air which is mixed with the product P while the latter is transferred to the mixing and cooling unit (chamber 4) in such a way as to facilitate the preparation of the ice cream.

In a second step of squeezing the case 202, the whole of the second stretch 214b of the second portion 214 of the nozzle 210 protrudes beyond the base wall 203 of the capsule 201 when the capsule 201 is further compressed.

The side wall 204 is compressed at the second zone 204b thanks to the second lines of compliance 220.

Figure 6:
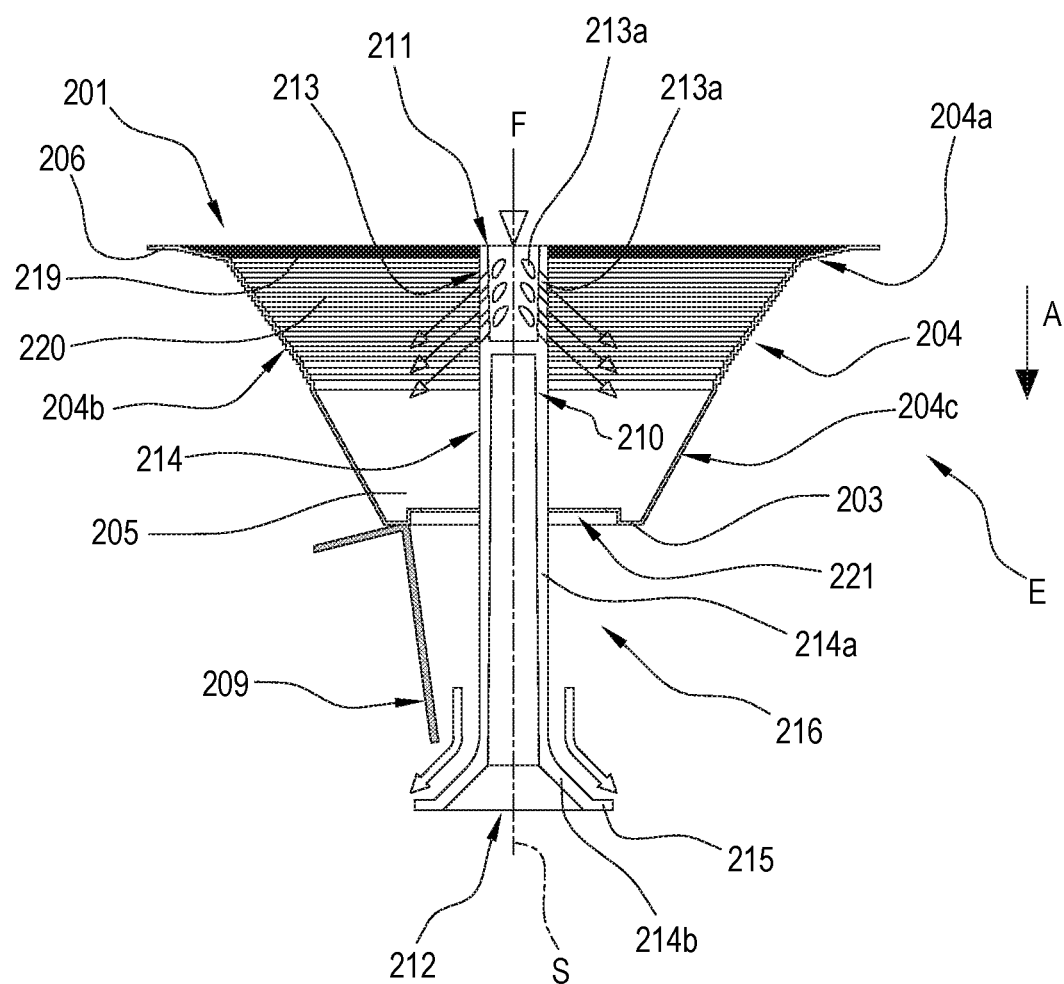

That way, the volume of the case 202 is further reduced, as shown in FIG. 6, because the capsule 201 passes from the second configuration J to a third and final, compressed configuration E, where the capsule 201 is further deformed and its volume is at its minimum.

During the second squeezing step, the injection means continue injecting the fluid F to complete dispensing of the product P to the mixing and cooling device.

When dispensing of the product P is finished, the dispensing unit 106 moves back up to its starting position so that the drawer 101 can be extracted from the compartment 109 and the used capsule 201 can be removed by simply turning the drawer upside down.

According to another aspect, more generally speaking, the unit 9 for receiving and treating the capsule 201 comprises a seat 112 for loading the capsule 201 and a dispensing unit 106 equipped with at least one element of contact with an upper wall 208 of the capsule 201 which is movable between a spaced-apart position where it is spaced from the capsule 201 and a contact and compression position where it compresses the upper wall 208 of the capsule.

Preferably, the injection means comprise an element for distributing a pressurized fluid and configured to establish a fluid connection with an inner cavity 205 of the capsule 201 and the dispensing unit 106 supports the pressurized fluid distribution element (movably between the spaced-apart position and the contact and compression position).

According to another aspect, a method for making ice cream in portions is also defined.

The method comprises the following steps:
preparing a capsule 201 containing a basic preparation P;
preparing a processing container 3 and associating the processing container 3 with a stirrer 5 mounted inside the processing container 3 rotatably (by means of an actuator or drive motor);
preparing a cooling system 13 equipped with at least one heat exchanger 15 and associating the heat exchanger 15 with the processing container 3 to exchange heat with the container 3 so as to cool the processing container 3;
preparing a capsule 201 having an upper wall 208—that is, a covering element 208—side walls 204 and a lower base wall 203, which define a cavity 205 for containing a basic ice cream preparation P (preferably in powder form);
preparing an opening 207 of the capsule 201 (preferably at the base wall 203);
deforming the side walls 204 of the capsule 201 by compression so as to squeeze (deform) the capsule 201 and thereby cause the basic product to be delivered through the opening 207 (in the base wall 203);
transferring the basic preparation P from the capsule 201 into the container 3;
introducing a dilution liquid (preferably water) into the container 3;
stirring and mixing the basic preparation P and the dilution liquid by means of the stirrer 5, and simultaneously cooling the basic preparation P mixed with the dilution liquid to a temperature between −15° C. and −2° C. so as to make a portion of finished product (ice cream).

According to another aspect, the method comprises a step of injecting a pressurized fluid into the cavity 205 of the capsule 201 to assist the exit of the basic preparation P through the opening 207 (and transferring the preparation P into the container 3).

It should be noted that according to this aspect, the basic preparation P is transferred, together with the pressurized fluid, and by means of the pressurized fluid itself, into the container 3, that is, into the processing chamber 4 (preferably directly, that is to say, without going by way of intermediate pipes or ducts).

Preferably, the pressurized fluid is a gas (and still more preferably, air)

It should be noted that, advantageously, the transfer of the basic preparation P (preferably in powder form) together with the pressurized fluid, and by means of the pressurized fluid itself, from the capsule 201 to the container 3 has considerable advantages in terms of machine cleaning, food safety and maintenance.

Moreover, the capsule can easily be emptied completely by means of the pressurized fluid, without leaving residues of the product P inside it (this is especially true if the basic product P is powder).

It should be noted that, preferably, according to another aspect, the step of injecting a pressurized fluid and deforming the side walls 204 of the capsule 201 by compression in order to squeeze the capsule 201 are substantially at least partly concurrent.

Preferably, the pressurized fluid F is not supplied until the capsule 201 has been opened (that is to say, the step of injecting the pressurized fluid into the cavity 205 of the capsule 201 follows a step of preparing an opening 207 of the capsule).

According to yet another aspect, the step of injecting a pressurized fluid into the cavity 205 of the capsule 201 comprises a step of injecting pressurized air into the cavity 205 of the capsule 201.

According to yet another aspect, the step of preparing a capsule 201 comprises a step of making a bottom opening 207, in the base wall 203 and slidably inserting a nozzle 210 into the opening 207.

The nozzle 210 is provided with the first, upper hollow portion 213 communicating with the cavity 205 of the capsule through the plurality of openings 213a.

According to this aspect, the step of injecting a pressurized fluid into the cavity 205 of the capsule 201 comprises a step of injecting pressurized fluid into the cavity 205 of the capsule 201 through the holes or openings 213a.

It should be noted that, more generally speaking, the nozzle 210 is movable between a first position and second position.

According to another aspect, the step of preparing an opening 207 in the capsule 201 comprises a step of making an opening 207 in the capsule 201 in the base wall 203 of the capsule 201.

With reference to another aspect, not illustrated, it should be noted that the machine comprises a support for a container (e.g. a cup) adapted to receive the finished product (ice cream).

It should be noted that the support is configured to vibrate so as to allow better distributing the product inside the cup.

It should be noted that the support is made to vibrate while the cup placed on the support itself is being filled so that the cup vibrates while it is being filled.

Preferably, the machine comprises a vibrating actuator connected to the support and adapted to impart vibrations thereto.

What is claimed is:

1. A machine for making at least one chosen from a liquid and semi-liquid ice cream product, comprising:
a processing container forming a processing chamber for making an ice cream product;

a stirrer mounted inside the processing chamber;

a cooling system including a heat exchanger associated with the processing container, for exchanging heat with the processing container and cooling the processing container;

a receiving and treating unit for receiving and treating a capsule containing a basic preparation for the ice cream product, the receiving and treating unit including a seat for loading the capsule, the receiving and treating unit configured to compress the capsule to deform lateral walls of the capsule and to squeeze the basic preparation out of the capsule and transfer the basic preparation to the processing container;

an injection device associated with the processing container for injecting a dilution liquid into the processing container, the injection device including a duct connected to the processing container for guiding the dilution liquid to the processing container;

wherein the receiving and treating unit includes a pressurized injection device for injecting a pressurized fluid into the capsule to assist exit of the basic preparation from the capsule and transfer of the basic preparation to the processing container.

2. The machine according to claim 1, wherein the machine is a machine for making ice cream and the processing container defines, in combination with the heat exchanger associated with the processing container, a mixing and cooling unit for processing the ice cream.

3. The machine according to claim 1, wherein the receiving and treating unit comprises a movable drawer including the seat for loading the capsule, the movable drawer being movable between an extracted position for loading the capsule and an inserted position.

4. The machine according to claim 1, wherein the receiving and treating unit comprises a dispensing unit including a contact element for contacting an upper wall of the capsule and which is movable between a spaced-apart position where the contact element is spaced from the capsule and a contact and compression position where the contact element compresses the upper wall of the capsule.

5. The machine according to claim 4, wherein the receiving and treating unit comprises an actuator operatively coupled to the dispensing unit to move the dispensing unit between the spaced-apart position and the contact and compression position.

6. The machine according to claim 1, wherein the pressurized injection device includes a distributing element for distributing the pressurized fluid and configured to establish a fluid connection with an inner cavity of the capsule, and wherein the receiving and treating unit includes a dispensing unit supporting the distributing element.

7. The machine according to claim 1, wherein the injection device includes a storage tank for the dilution liquid and wherein the duct connects the storage tank to the processing container.

8. The machine according to claim 1, wherein the processing container is between 157,000 mm$^3$ and 1,962,500 mm$^3$ in volume.

9. A method for making ice cream in portions, comprising the following steps:

providing a capsule containing a basic preparation;

providing a processing container and associating the processing container with a stirrer rotatably mounted inside the processing container;

providing a cooling system including a heat exchanger and associating the heat exchanger with the processing container to exchange heat with the container to cool the processing container;

providing a receiving and treating unit for receiving and treating the capsule, the receiving and treating unit including a seat for loading the capsule, the receiving and treating unit configured to compress the capsule to deform walls of the capsule and to squeeze the basic preparation out of the capsule and transfer the basic preparation to the processing container;

providing an injection device associated with the processing container for injecting a dilution liquid into the processing container, the injection device including a duct connected to the processing container for guiding the dilution liquid to the processing container;

providing that the receiving and treating unit includes a pressurized injection device for injecting a pressurized fluid into the capsule to assist exit of the basic preparation from the capsule and transfer of the basic preparation to the processing container;

providing a capsule having an upper wall, side walls and a lower base wall, which define a cavity for containing the basic preparation;

providing an opening in the capsule;

deforming the side walls of the capsule by compression to squeeze the capsule and thereby cause the basic product to be delivered through the opening;

transferring the basic preparation from the capsule into the processing container;

introducing a dilution liquid into the container;

stirring and mixing the basic preparation and the dilution liquid with the stirrer, and simultaneously cooling the basic preparation and the dilution liquid to a temperature between −2° C. and −15° C. to make a portion of ice cream.

10. The method according to claim 9, further comprising a step of injecting the pressurized fluid into the cavity of the capsule to assist the exit of the basic preparation through the opening and transferring the basic preparation into the processing container.

11. The method according to claim 10, and further comprising transferring the basic preparation, together with the pressurized fluid, and via the pressurized fluid, into the processing container.

12. The method according to claim 10, and further comprising providing that the pressurized fluid is a gas.

13. The method according to claim 10, wherein the step of injecting the pressurized fluid into the cavity of the capsule comprises a step of injecting pressurized air into the cavity of the capsule.

14. A machine for making at least one chosen from a liquid and semi-liquid ice cream product, comprising:

a processing container forming a processing chamber for making an ice cream product;

a stirrer mounted inside the processing chamber;

a cooling system including a heat exchanger associated with the processing container, for exchanging heat with the processing container and cooling the processing container;

a receiving and treating unit for receiving and treating a capsule containing a basic preparation for the ice cream product, the receiving and treating unit including a seat for loading the capsule, the receiving and treating unit configured to compress the capsule to deform lateral walls of the capsule and to squeeze the basic preparation out of the capsule and transfer the basic preparation to the processing container;

an injection device associated with the processing container for injecting a dilution liquid into the processing container, the injection device including a duct connected to the processing container for guiding the dilution liquid to the processing container;

a pressurized injection device for injecting a pressurized fluid into the capsule, the pressurized injection device including a distributing element for distributing the pressurized fluid and configured to establish a fluid connection with an inner cavity of the capsule, and wherein the receiving and treating unit includes a dispensing unit supporting the distributing element.

* * * * *